(12) United States Patent
Unger

(10) Patent No.: US 11,313,710 B2
(45) Date of Patent: Apr. 26, 2022

(54) FASTENING ADAPTER FOR A SENSOR

(71) Applicant: Turck Holding GmbH, Halver (DE)

(72) Inventor: Kay Unger, Lauter-Bernsbach (DE)

(73) Assignee: Turek Holding GmbH, Halver (DE)

( * ) Notice: Subject to any disclaimer, the term of this patent is extended or adjusted under 35 U.S.C. 154(b) by 16 days.

(21) Appl. No.: 16/929,957

(22) Filed: Jul. 15, 2020

(65) Prior Publication Data
US 2021/0018355 A1  Jan. 21, 2021

(30) Foreign Application Priority Data

Jul. 15, 2019  (DE) .......................... 102019119067.3

(51) Int. Cl.
*G01F 15/18* (2006.01)
(52) U.S. Cl.
CPC .................................. *G01F 15/185* (2013.01)
(58) Field of Classification Search
CPC ............................... G01F 15/18; G01F 15/185
See application file for complete search history.

(56) References Cited

U.S. PATENT DOCUMENTS

| 4,833,923 | A  | * | 5/1989 | Kamentser | ............ | G01F 1/3209 |
| | | | | | | 73/861.24 |
| 7,886,616 | B1 | * | 2/2011 | Hayman | ............... | G01F 15/185 |
| | | | | | | 73/861.78 |
| 2006/0191825 | A1 | * | 8/2006 | Veltri | ...................... | G01F 15/18 |
| | | | | | | 210/85 |
| 2012/0036942 | A1 | * | 2/2012 | Hasunuma | .............. | G01F 1/662 |
| | | | | | | 73/861.28 |
| 2015/0107379 | A1 | * | 4/2015 | Rose | ....................... | G01F 15/18 |
| | | | | | | 73/866.5 |
| 2018/0292247 | A1 | * | 10/2018 | Kobayashi | ............ | G01F 15/185 |

FOREIGN PATENT DOCUMENTS

| DE | 202011002102 U1 | 6/2011 | |
| DE | 102016114565 A1 | 2/2018 | |
| KR | 1845924 B1 * | 4/2018 | ............ F16L 19/005 |

* cited by examiner

*Primary Examiner* — Francis C Gray
(74) *Attorney, Agent, or Firm* — Whitmyer IP Group LLC

(57) ABSTRACT

A device for fastening a bar-shaped sensor, in particular a flow sensor, to a component, which has a fastening section that can be inserted into a fastening opening of the component, a hole extending through the fastening section and a retaining section for inserting the sensor, wherein the hole is open to an end face of the fastening section and to an end face of the retaining section. In order to be able to change out a sensor with a reproducible rotational position, it is proposed that the wall of the hole in the fastening section have an opening, into which a section of the edge of the fastening opening protrudes in the free cross-section of the hole for rotationally fixating the sensor in the hole.

15 Claims, 3 Drawing Sheets

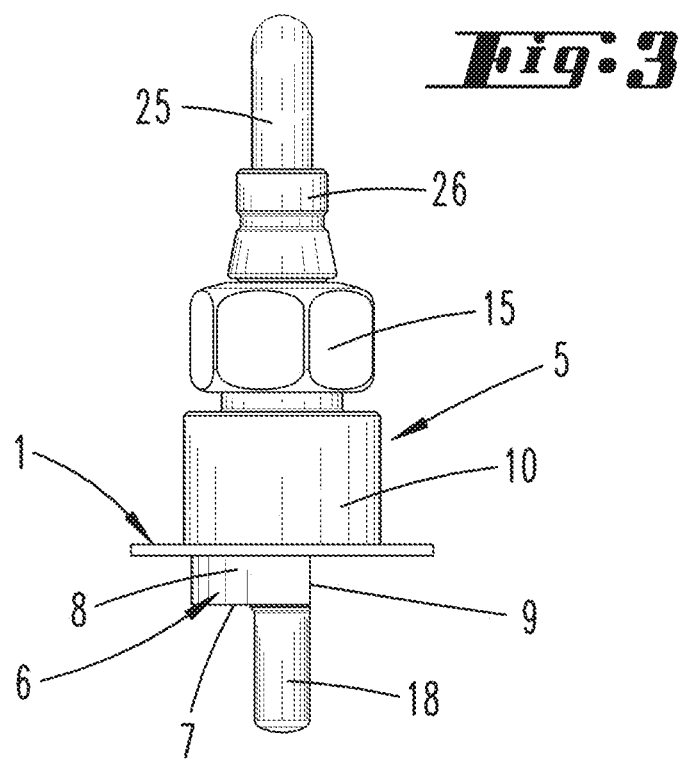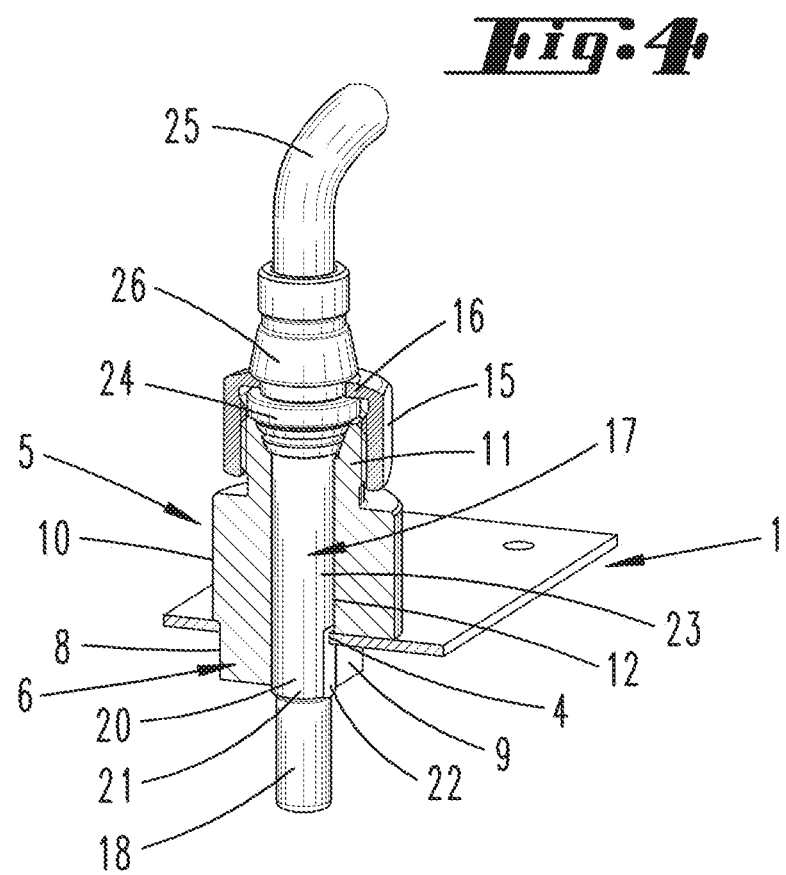

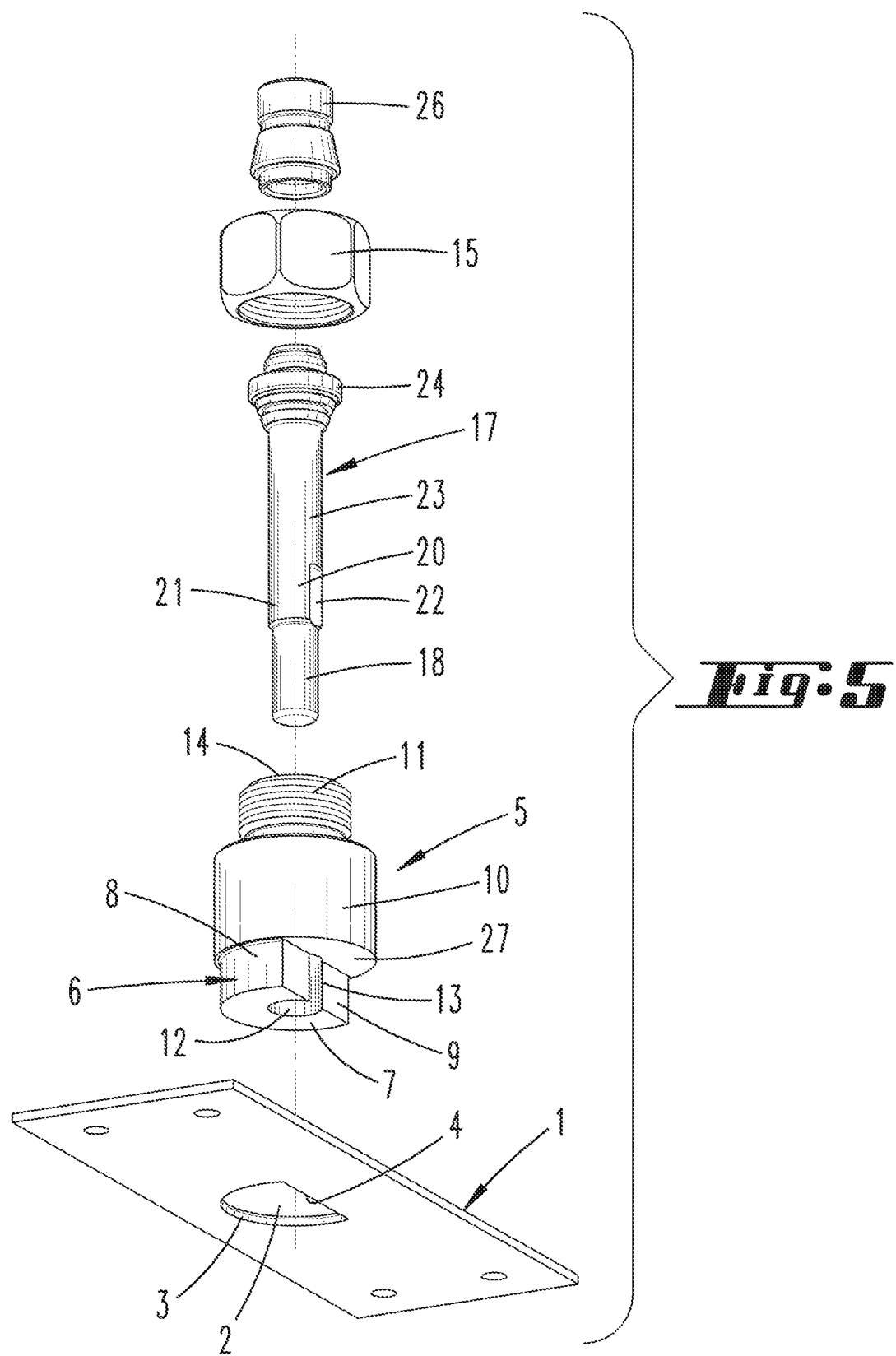

FASTENING ADAPTER FOR A SENSOR

TECHNICAL FIELD

The invention relates to a device for fastening a bar-shaped sensor, in particular a flow sensor, to a component, which has a fastening section that can be inserted into a fastening opening of the component, a hole extending through the fastening section and a retaining section for inserting the sensor, wherein the hole is open to an end face of the fastening section and to an end face of the retaining section, into whose free cross-section a rotationally fixating means for rotationally fixating the sensor extends. The invention further relates to a sensor with a device.

BACKGROUND

DE 20 2011 002 102 U1 describes a generic device, in which a disk having a flattened area is arranged between two sleeve elements attached one to the other.

DE 10 2016 114 565 A1 describes a measuring assembly with a bar-shaped sensor, which can be clamped into an opening of a component.

Sensors of the kind described above are fastened to a component with fastening adapters, for example to a pipe. The pipe has a fastening opening, into which a fastening adapter of the fastening adapter can engage. The fastening adapter is welded with the component. A bar-shaped sensor can be inserted through a hole of the fastening adapter into the cavity of a pipe enveloped by the component in such a way that a head of the sensor protrudes into the cavity. If a fluid stream flows through the cavity, a measuring element arranged in the head of the sensor can be used to measure a flow rate of the medium. If such a sensor has to be replaced, it is pulled out of the hole after detaching a fastening element, and a new sensor is inserted into the hole. The rotational orientation of the sensor must be identical to the one the previous sensor had to deliver reproducible flow rate values.

SUMMARY

The object of the invention is to improve a generic device and a generic fastening adapter in terms of advantageous use and/or production technology.

The object is achieved by the invention indicated in the claims, wherein the subclaims are not just advantageous further developments of the independent claims, but also each represent independent solutions of the object.

The inventive configuration can lead to an exemplary embodiment in which the fastening section of the fastening adapter has a flattened area. This flattened area can extend through the hole, so that the flattened area is comprised of two partial surfaces, which are separated from each other by an oblong hole. The sensor inserted into the hole has a flattened area, which in the completely inserted state of the sensor aligns flush with the flattened area of the fastening section. The flattened area of the sensor thus lies in the oblong hole extending between the two partial surfaces. The fastening opening can have a section that runs along a straight line, against which the mutually aligning flattened areas abut. As a consequence of this configuration, the rotational position of the sensor is defined by the progression of the straight edge section of the fastening opening. The contour of the fastening opening can be shaped like a D.

The opening in the circumferential wall of the fastening section extends until into the hole, so that a section of the edge of the fastening opening having basically any shape desired can there reach inside, so as to diminish the free cross-section of the hole there.

It is regarded as advantageous that the rotational fixation means for rotationally fixating the sensor known from prior art be comprised of a section of an edge of a fastening opening that inwardly protrudes through an opening of the wall of a hole. The edge of the fastening opening can here preferably consist of a first component, which can be fabricated separately from the fastening adapter. Contrary to prior art, this component is not inserted between two sleeve elements. The fastening adapter is instead inserted into an opening of the first component, wherein this opening has an edge section that protrudes into the free cross-section of the otherwise circular hole.

Exemplary embodiments of the invention can have a fastening adapter having an essentially rotationally symmetrical body. A fastening section of the fastening adapter has a contour that can correspond to the contour of the fastening opening. The fastening section can comprise a fastening flange, which can be used to fasten the fastening adapter to the first component, which can border a cavity. Exemplary embodiments of the invention can have a fastening adapter having a radial opening to the hole, in which the opening is shaped in such a way that an edge section of the edge of the fastening opening protrudes into the hole, so as to diminish the free cross-section of the hole. A circumferential line of a contour of the fastening section deviating from a circular shape, which need not necessarily be shaped like a D, extends through the free cross-sectional surface of the hole, which can have a circular contour. A section of the edge of the fastening opening can protrude into the radial opening of the hole created in this way. A section of the preferably bar-shaped sensor has a contour that deviates from a circular shape in such a way that the section of the edge of the fastening opening protruding into the hole lies in a radial depression, for example a flattened area of the sensor. Exemplary embodiments of the invention can be designed in such a way that the contour of the fastening section is a circle cut by a straight line, that the contour of the fastening opening is a circle cut by a straight line, and/or that the contour of the sensor corresponds to a circle cut by a straight line. It can further be provided that a head of the sensor protrude from the end face of the fastening section in the assembled state. This head of the sensor can comprise a measuring cell, which can measure the flow of a fluid. The diameter of the head can be less than the diameter of the section of the sensor that is inserted into the fastening adapter. The diameter of an envelope circle of the fastening section and/or diameter of an envelope circle of the threaded section can be less than the diameter of an envelope circle of a section that extends between the fastening section and threaded section. A further development of the invention can provide that the sensor be fastened to the fastening adapter with a union nut screwed onto the threaded section. One shoulder of the sensor can here be supported on the end face of the fastening adapter. The union nut can be supported on an opposing shoulder of the sensor. The inventive configuration allows the sensor to be pulled out of the hole of the fastening adapter in an axial direction after detaching the fastening element. A sensor with an exemplarily identical structure can be inserted into the hole, and fastened with the fastening element in a defined axial position and rotational position relative to the fastening adapter. It is advantageous that the radius of the head of the sensor correspond to the distance between the flattened area and figure axis of the sensor.

BRIEF DESCRIPTION OF THE DRAWINGS

An exemplary embodiment of the invention will be explained below based upon attached drawings. Shown on:

FIG. 3 is a second side view of the assembly according to FIG. 1, FIG. 4 is a perspective view of a section according to line IV-IV on FIG. 2, and FIG. 5 is an exploded view of the elements of the assembly according to the invention.

DETAILED DESCRIPTION

Figure 1:
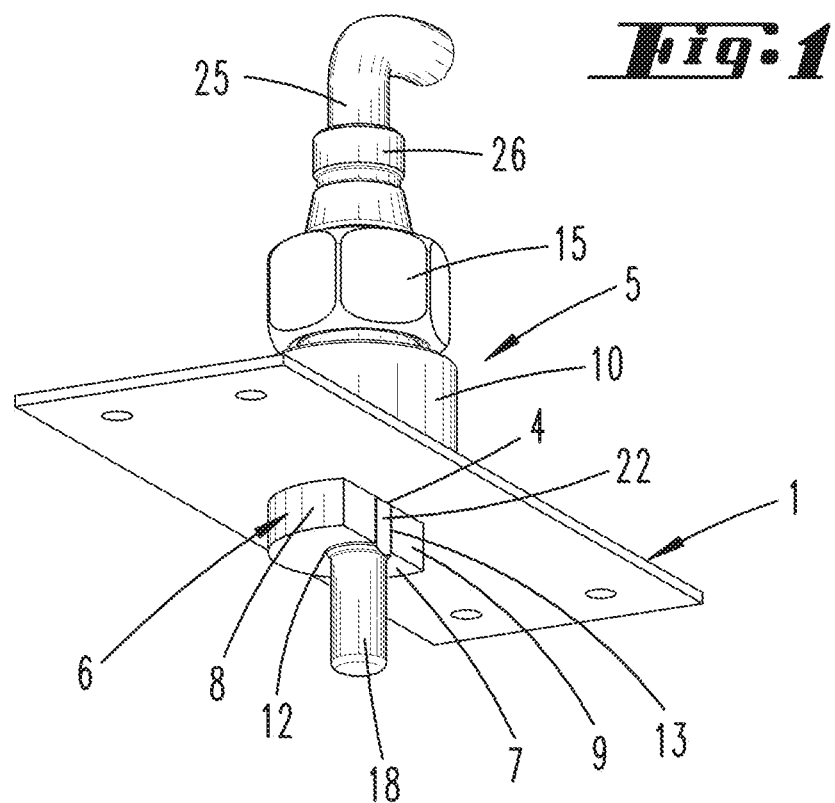
FIG. 1 is a first perspective view of an assembly comprised of a component 1, a fastening adapter 5 and a sensor 17 fastened to the fastening adapter 5.
Figure 2:
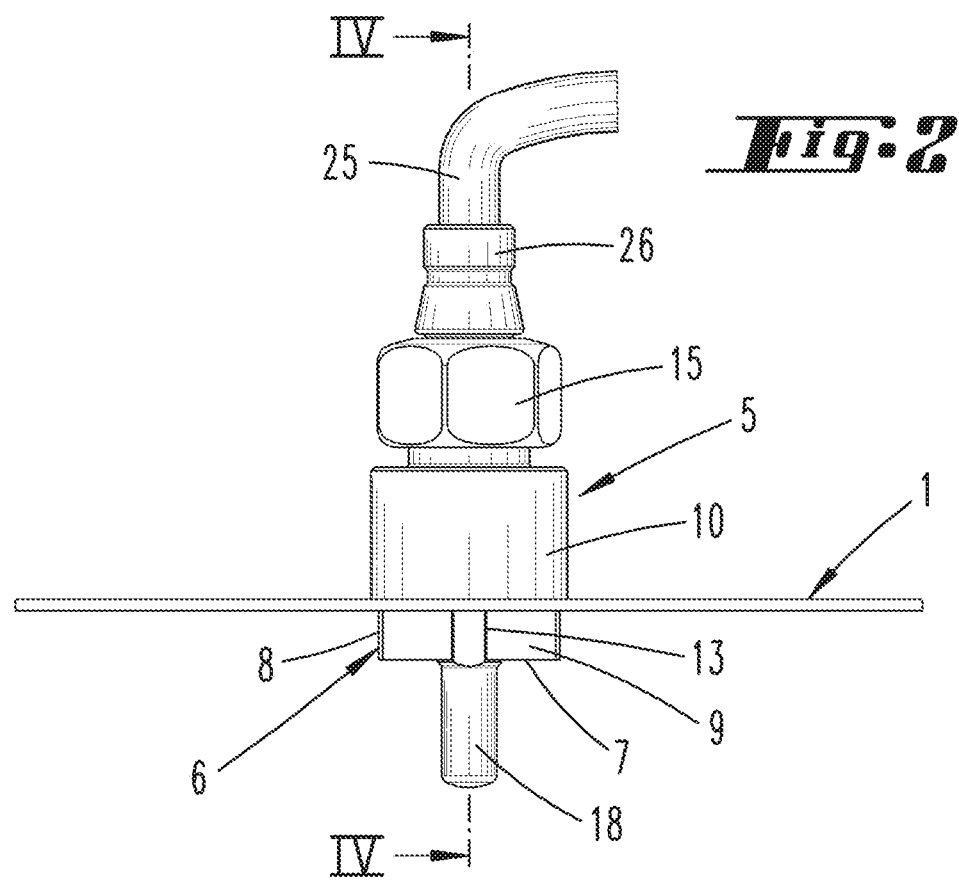
FIG. 2 is a side view of the assembly according to FIG. 2.

Reference number 1 denotes a component that can be a fastening plate, which can be used to fasten a sensor 17 to a container, a pipe, or the like. However, the component 1 can also be the wall of a container, for example of a pipe.

The component 1 has a fastening opening 2, which has a first edge section that runs on a circular arc line, and has a second edge section 4 that runs along a straight line, so that the contour of the fastening opening 2 is roughly D-shaped.

A fastening adapter 5 made out of metal, for example steel, has a fastening section 6 whose contour essentially corresponds to the contour of the fastening opening 2, so that the fastening section 6 can be inserted into the fastening opening 2. For this purpose, the fastening section 6 has a circumferential section 8 shaped like a circular cylinder and a straight circumferential section 9, which comprises two planes that align with each other. The two planes 9 are separated from each other by an oblong opening 13.

The fastening adapter 5 has a central hole 12, which has a circular contour. The imagined plane in which the straight circumferential sections 9 lie cuts the hole 12, so that the oblong gap visible on FIG. 5 arises in the form of an oblong hole 13.

The fastening section 6 is adjoined by a central section 10, which is shaped like a circular cylinder. A threaded section 11 with a male thread adjoins the central section 10. The threaded section 11 has an end face 14 into which empties the hole 12 lying opposite an end face 7 of the fastening section 6.

A bar-shaped sensor 17 has an elongated shaft having a cylinder section 23 adjoined by an essentially likewise cylindrically running section 20. The section 20 has a circularly cylindrical circumferential section 21 and a flattened area 22. The section 20 is adjoined by a head 18 of the sensor 17, in which a measuring element is arranged. The diameter of the head 18 is smaller than the diameter of the circularly cylindrical circumferential section 21. The distance between the flattened area 22 and the central axis of the sensor 17 corresponds to roughly the radius of the head 18.

On the side lying opposite the head 18, the cylinder section 23 is adjoined by a retaining section, which has a support shoulder 24.

The fastening adapter 5 is inserted into the fastening opening 2 with its fastening section 6, and can be welded with the component 1. The straight edge section 4 here abuts against the planar circumferential sections 9, and projects into the hole 12, so that the free cross-section of the hole 12 is diminished on one side at that location. The fastening adapter 5 can only be inserted into the fastening opening 2 in a defined rotational position. It is then non-rotatably inserted into the fastening opening 2.

The section of the edge 4 protruding into the hole 12 thus forms a finding projection, against which the flattened area 22 can abut after the sensor 17 has been pushed into the hole 12. Due to its smaller diameter, the cylindrical head 8 can pass by the projection formed in this way.

FIG. 4 shows the assembly depicted on FIG. 5 in its individual parts, comprised of a component 1, fastening adapter 5 and sensor 17, in an assembled state. The sensor 17 is pushed through the opening of the hole 12 that extends in the end face and into the hole 12 in an axial direction, until the support shoulder 24 abuts against the end face 14. The head 18 protrudes out of the end face 7. By screwing the union nut 15 onto the male thread of the threaded section 11, the sensor 17 can be axially retained on the fastening adapter 5. A support flank 16 of the union nut 15 is here supported on the support shoulder 24, which is formed by a collar. A connecting cable 25 can extend through a fitting 26, which can be inserted on the end of the sensor 17 lying opposite the head 18.

The sensor can only be inserted into the hole 12 in a defined rotational position. The sensor inserted into the hole 12 cannot be turned.

In particular, the invention relates to an assembly comprised of a component 1 and a sensor 17, in particular a flow rate sensor, fastened to the component 1 with a fastening adapter 5, wherein the fastening adapter 5 has an essentially rotationally symmetrical body, with a fastening flange 6 that has a first contour and is inserted into a fastening opening 2 of the component 1, which has a second contour corresponding to the first contour, wherein the fastening adapter 5 has a male thread section lying opposite the fastening section 6 on which is screwed a threaded element 15, with which the sensor 17 is fastened to the fastening adapter 5, which is inserted into a hole 12 that extends between the end face 7 of the fastening flange 6 and an end face 14 of the threaded section 11. It is essential that the fastening flange 6 have a non-circular first contour, wherein the cross-sectional surface of the hole 12 is cut by the circumferential line of the first contour. The sensor 17 has a section 20, which lies in the area of the fastening flange 6 and has a third contour, whose circumferential line follows the circumferential line of the first contour in the area in which the cross-sectional surface of the hole 12 is cut by the circumferential line of the first contour, and abuts against the edge 4 of the fastening opening 2.

The above statements serve to explain the inventions encompassed by the application as a whole, which further develop the prior art at least by the following feature combinations, each even independently, wherein two, several or all of these feature combinations can also be combined, specifically:

A device for fastening a bar-shaped sensor 17, characterized in that the wall of the hole in the fastening section 6 has an opening 13, into which a section 4 of the edge of the fastening opening 2 protrudes in the free section of the hole 12 for rotationally fixating the sensor 1 in the hole.

A device, characterized in that the fastening section 6 transitions into a central section 10 arranged between the fastening section 6 and retaining section 11 to form a step 27, wherein the oblong opening 13 extends from the end face 7 to the step 27.

A device, characterized in that the oblong opening 13 is flanked by two surfaces 9 lying in a shared plane, which in the installed state abut against the straight edge section 4 of the fastening opening 2, wherein the shared plane runs through the volume of the hole 12.

A device, characterized by a fastening element 15 that can be fastened to the retaining section 11 for axially retaining the sensor 17 in the hole 12, wherein it is provided in particular that the retaining section 11 have a male thread, onto which a union nut 15 comprised of the fastening element 15 is screwed.

A device, characterized in that, after detaching the fastening element 15, the sensor 17 can be pulled in an axial direction out of a fastening adapter 5 that comprises the hole 12 and is fixedly connected, in particular welded, with the component 1 and/or inserted in an axial direction into the hole 12 and fastened with the fastening element 15 in a defined axial position and rotational position relative to the fastening adapter 5, wherein it is provided in particular that a support collar or support shoulder 24 be supported on an end face 14 of the fastening adapter 5.

A sensor, characterized in that a section 20 adjoins a cross-sectionally diminished head 18 extending over the end face 7 in an installed state, and has a contour that is adjusted to the contour of the hole 12 cross-sectionally diminished by the section 4 of the edge of the fastening opening 2 protruding into the hole 12, with an abutment zone 22 for abutting the section 4 of the edge of the fastening opening 2.

A sensor, characterized in that the abutment zone is comprised of a flattened area 22 of a section 20 that otherwise forms a circularly cylindrical circumferential section 21 and/or that the end of the sensor 17 facing away from the head 18 has a support collar that can be overlapped by the fastening element 15.

A fastening adapter, characterized in that the fastening section 6 has two surfaces 9 that lie in a shared plane running through the volume of the hole 12, and flank an oblong opening 13 of the hole 12 in such a way that a central area of a straight edge section 4 of the fastening opening 2 can engage into the free cross-section of the hole 12.

A fastening adapter, characterized in that the retaining section 11 has a male thread.

A device, a sensor, or a fastening adapter, characterized by one or several features of the preceding claims or specification.

All disclosed features are essential to the invention (separately, but also in combination). The disclosure of the application hereby also completely incorporates the disclosure content of the accompanying/attached priority documents (copy of preliminary application), also for the purpose of including features of these documents in claims of the present application. Even without the features of a referenced claim, the subclaims with their features characterize separate inventive further developments of prior art, in particular so as to generate partial applications based upon these claims. The invention indicated in each claim can additionally have one or several of the features indicated in the above specification, in particular those provided with reference numbers, and/or in the reference list. The invention also relates to embodiments in which individual features mentioned in the above specification have not been realized, in particular to the extent they are obviously unnecessary for the respective intended application or can be replaced by other technically equivalent means.

The invention claimed is:

1. A device for fastening a bar-shaped sensor, in particular a flow sensor, to a component, which has a fastening adapter with a fastening section that can be inserted into a fastening opening of the component, and a hole extending through the fastening section and a retaining section for inserting the sensor, wherein the hole is open to an end face of the fastening section and to an end face of the retaining section, into whose free cross-section a rotationally fixating means for rotationally fixating the sensor extends, wherein the rotationally fixating means is included of a section of the edge of the fastening opening that protrudes through an opening of the wall of the hole in the fastening section.

2. The device according to claim 1, wherein the fastening section transitions into a central section arranged between the fastening section and retaining section to form a step, wherein the oblong opening extends from the end face to the step.

3. The device according to claim 1, wherein the opening is flanked by two surfaces lying in a shared plane, which in the installed state abut against the straight edge section of the fastening opening, wherein the shared plane runs through the volume of the hole.

4. The device according to claim 1, characterized by a fastening element that can be fastened to the retaining section for axially retaining the sensor in the hole.

5. The device according to claim 1, wherein the retaining section has a male thread, onto which a union nut included of the fastening element is screwed.

6. The device according to claim 1, wherein, after detaching the fastening element, the sensor can be pulled in an axial direction out of a fastening adapter that includes the hole and is fixedly connected with the component.

7. The device according to claim 6, wherein the fastening adapter is welded with the component.

8. The device according to claim 1, wherein the sensor can be inserted in an axial direction into the hole and fastened with the fastening element in a defined axial position and rotational position relative to the fastening adapter.

9. The device according to claim 8, wherein a support collar or support shoulder is supported on an end face of the fastening adapter.

10. A sensor with a fastening device for a component, which has a fastening adapter with a fastening section that can be inserted into a fastening opening of the component, and a hole extending through the fastening section and a retaining section for inserting the sensor, wherein the hole is open to an end face of the fastening section and to an end face of the retaining section, into whose free cross-section a rotationally fixating means for rotationally fixating the sensor extends, wherein the rotationally fixating means is included of a section of the edge of the fastening opening that protrudes through an opening of the wall of the hole in the fastening section, and wherein a section adjoins a cross-sectionally diminished head of the sensor extending over the end face in an installed state, and has a contour that is adjusted to the contour of the hole cross-sectionally diminished by the section of the edge of the fastening opening protruding into the hole, with an abutment zone for abutting the section of the edge of the fastening opening.

11. The sensor according to claim 10, wherein the abutment zone is comprised of a flattened area of a section that otherwise forms a circularly cylindrical circumferential section.

12. The sensor according to claim 10, wherein the end of the sensor facing away from the head has a support collar that can be overlapped by the fastening element.

13. An adapter for a fastening a sensor to a component, comprising a fastening adapter with a fastening section that can be inserted into a fastening opening of the component, and a hole extending through the fastening section and a retaining section for inserting the sensor, wherein the hole is open to an end face of the fastening section and to an end face of the retaining section, into whose free cross-section a rotationally fixating means for rotationally fixating the sensor extends, wherein the rotationally fixating means is included of a section of the edge of the fastening opening that protrudes through an opening of the wall of the hole in the fastening section, and with a fastening section that has an end face and transitions into a central section arranged between the fastening section and retaining section to form a step, and a hole extending from the end face to an end face of the retaining section for inserting a sensor, wherein the fastening section has two surfaces that lie in a shared plane running through the volume of the hole, and flank an oblong opening of the hole in such a way that a central area of a straight edge section of the fastening opening can engage into the free cross-section of the hole.

14. The fastening adapter according to claim 13, wherein the retaining section has a male thread.

15. The device according to claim 1, wherein the opening of the wall of the hole in the fastening section is an oblong opening.

* * * * *